United States Patent
Almeida et al.

(10) Patent No.: US 11,756,461 B2
(45) Date of Patent: Sep. 12, 2023

(54) DISPLAY SYSTEM AND METHOD

(71) Applicant: MAGNA ELECTRONICS INC., Auburn Hills, MI (US)

(72) Inventors: Ramiro Almeida, Key Biscayne, FL (US); Pierre Beaudreau, St-Augustin-de-Desmaures (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 60 days.

(21) Appl. No.: 17/328,115

(22) Filed: May 24, 2021

(65) Prior Publication Data

US 2021/0366272 A1 Nov. 25, 2021

Related U.S. Application Data

(60) Provisional application No. 63/028,953, filed on May 22, 2020.

(51) Int. Cl.
*B60K 35/00* (2006.01)
*G08G 1/005* (2006.01)
(Continued)

(52) U.S. Cl.
CPC .............. *B60K 35/00* (2013.01); *G06V 20/58* (2022.01); *G06V 40/103* (2022.01); *G08G 1/005* (2013.01); *G08G 1/04* (2013.01); *G08G 1/09* (2013.01); *G09G 3/001* (2013.01); *B60K 2370/152* (2019.05); *B60K 2370/167* (2019.05); *B60K 2370/175* (2019.05); *B60K 2370/77* (2019.05);
(Continued)

(58) Field of Classification Search
None
See application file for complete search history.

(56) References Cited

U.S. PATENT DOCUMENTS 7,095,318 B1 * 8/2006 Bekhor .................. B60Q 1/503
340/464
8,874,372 B1 * 10/2014 Zhu ........................ G01C 21/26
382/103

(Continued)

FOREIGN PATENT DOCUMENTS

DE 102017202490 A1 8/2017

OTHER PUBLICATIONS

International Search Report and Written Opinion dated Aug. 25, 2021 from corresponding PCT Application PCT/US2021/033894, filed May 24, 2021.

(Continued)

*Primary Examiner* — Fekadeselassie Girma
(74) *Attorney, Agent, or Firm* — HONIGMAN LLP

(57) ABSTRACT

A method, computer program product, and computing system for monitoring one or more machine vision sensors to obtain perception information concerning one or more pedestrians proximate an autonomous vehicle; identifying one or more humanoid shapes within the perception information, thus defining one or more detected humanoid shapes; generating proximate object display information that locates the one or more detected humanoid shapes with respect to the autonomous vehicle; and rendering the proximate object display information on a visual display system, thus confirming the perception of the one or more pedestrians by the autonomous vehicle.

30 Claims, 11 Drawing Sheets

(51) Int. Cl.
*G08G 1/04* (2006.01)
*G09G 3/00* (2006.01)
*G08G 1/09* (2006.01)
*G06V 20/58* (2022.01)
*G06V 40/10* (2022.01)

(52) U.S. Cl.
CPC ..... *G06V 2201/08* (2022.01); *G09G 2380/10* (2013.01)

(56) References Cited

U.S. PATENT DOCUMENTS

| | | | | |
|---|---|---|---|---|
| 8,954,217 | B1* | 2/2015 | Montemerlo | B60W 50/082 |
| | | | | 701/411 |
| 10,279,734 | B2* | 5/2019 | Bertollini | B60Q 5/006 |
| 10,572,717 | B1* | 2/2020 | Zhu | G05D 1/0088 |
| 2002/0097163 | A1* | 7/2002 | Pederson | G09F 21/042 |
| | | | | 340/815.45 |
| 2004/0234136 | A1* | 11/2004 | Zhu | G06V 10/255 |
| | | | | 382/103 |
| 2016/0096525 | A1* | 4/2016 | Harvey | B60W 30/09 |
| | | | | 701/23 |
| 2017/0120804 | A1* | 5/2017 | Kentley | B60Q 1/507 |
| 2017/0270361 | A1* | 9/2017 | Puttagunta | G06V 20/56 |
| 2018/0072218 | A1* | 3/2018 | Sweeney | B60Q 1/44 |
| 2019/0129431 | A1* | 5/2019 | Yai | G01C 21/3848 |
| 2019/0235635 | A1* | 8/2019 | Hillis | B60Q 1/5037 |
| 2019/0236938 | A1* | 8/2019 | Ekladyous | B60Q 1/50 |
| 2020/0023776 | A1* | 1/2020 | Hamlin | H05K 7/20963 |
| 2020/0353949 | A1* | 11/2020 | Huang | G01C 21/3691 |
| 2021/0309263 | A1* | 10/2021 | Polyakov | G06Q 10/08355 |
| 2021/0362600 | A1 | 11/2021 | Almeida et al. | |
| 2021/0366276 | A1* | 11/2021 | Almeida | G09G 5/36 |

OTHER PUBLICATIONS

International Search Report and Written Opinion dated Sep. 8, 2021 from corresponding PCT Application PCT/US2021/033816, filed May 24, 2021.

International Search Report and Written Opinion dated Sep. 9, 2021 from corresponding PCT Application PCT/US2021/033860, filed May 24, 2021.

Minguez et al., "Extending Collision Avoidance Methods to Consider the Vehicle Shape, Kinematics, and Dynamics of a Mobile Robot" IEEE Transactions on Robotics, vol. 25, No. 2, Apr. 2009. Retrieved on Jul. 24, 2021. Retrieved from <URL:https:ieexplore. ieee.org/abstract/document/4803785> entire document.

\* cited by examiner

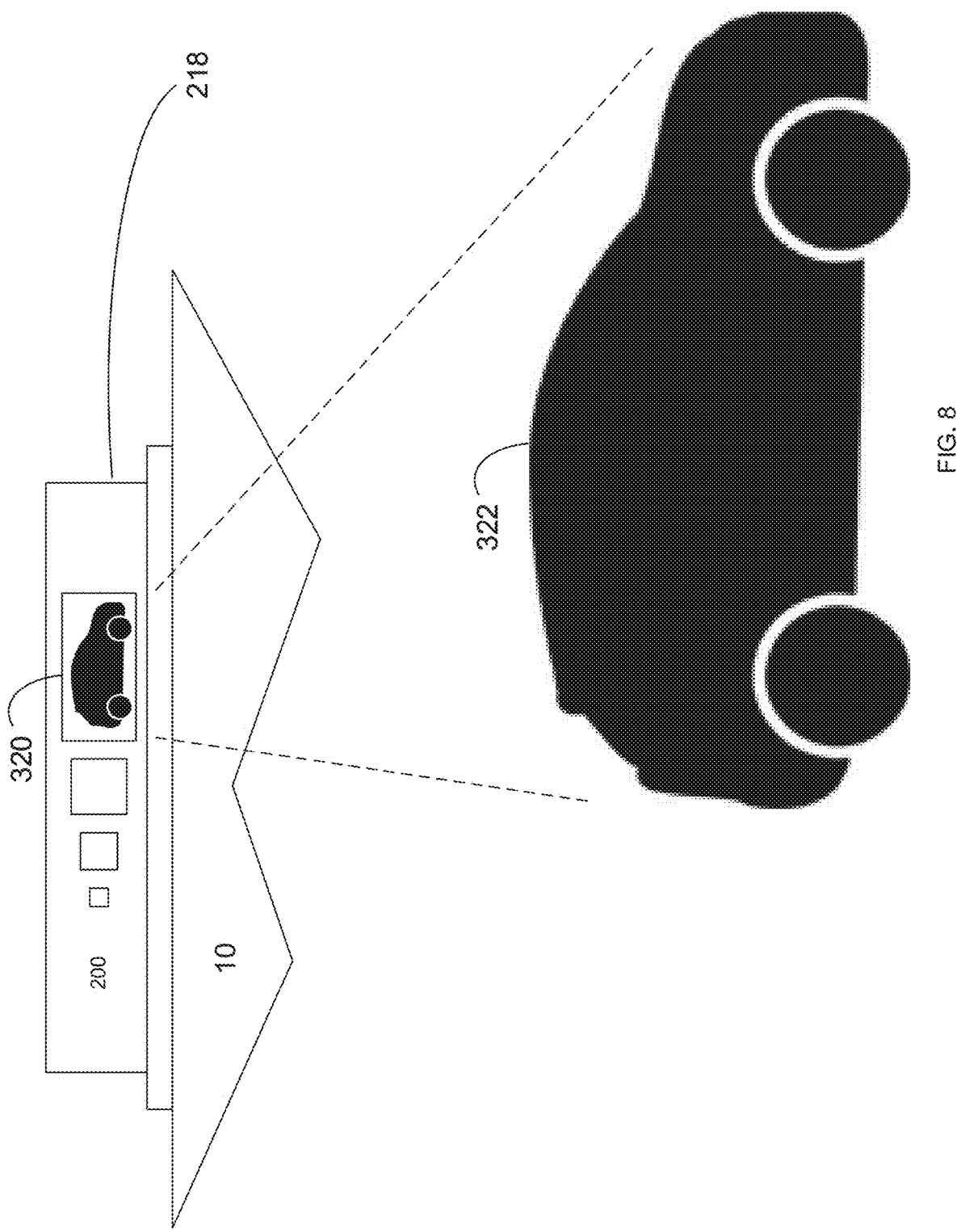

DISPLAY SYSTEM AND METHOD

RELATED APPLICATION(S)

This application claims the benefit of U.S. Provisional Application No. 63/028,953, filed on 22 May 2020, the entire contents of which are incorporated herein by reference.

TECHNICAL FIELD

This disclosure relates to display systems and, more particularly, to display systems for use in autonomous vehicles.

BACKGROUND

As transportation moves towards autonomous (i.e., driverless) vehicles, the manufactures and designers of these autonomous vehicles must address issues that are not a concern in traditional vehicles. Unfortunately, autonomous vehicles are still a rarity on the streets and people are still unsure of the manner in which they operate.

For example, when a person is waiting to cross a street at a crosswalk and a vehicle is approaching the same crosswalk, the person would normally wait until there is a signal that the driver of the vehicle sees them. For example, the person may wait until the driver of the other vehicle stares at them . . . or waves them on . . . or flashes their headlights at them.

However, an autonomous vehicle does not have a driver. Accordingly, there is no one in the vehicle that can provide the signal to the person waiting the cross the street at the crosswalk.

SUMMARY OF DISCLOSURE

Concept 2

In one implementation, a computer-implement method is executed on a computing device and includes: monitoring one or more machine vision sensors to obtain perception information concerning one or more pedestrians proximate an autonomous vehicle; identifying one or more humanoid shapes within the perception information, thus defining one or more detected humanoid shapes; generating proximate object display information that locates the one or more detected humanoid shapes with respect to the autonomous vehicle; and rendering the proximate object display information on a visual display system, thus confirming the perception of the one or more pedestrians by the autonomous vehicle.

One or more of the following features may be included. Identifying one or more humanoid shapes within the perception information may include: comparing one or more defined humanoid shapes to one or more unidentified objects within the perception information to identify one or more humanoid shapes within the perception information. The proximate object display information may include dynamic proximate object display information that changes as the location of the one or more detected humanoid shapes changes with respect to the autonomous vehicle. Rendering the proximate object display information on a visual display system may include: rendering the dynamic proximate object display information on the visual display system, thus dynamically confirming the perception of the one or more pedestrians by the autonomous vehicle. The one of more machine vision sensors may include a LIDAR system. The visual display system may be configured to be mounted on a roof of the autonomous vehicle. The visual display system may be a cylindrical visual display system. The cylindrical visual display system may include: an illuminated portion; and a non-illuminated portion positioned between the illuminated portion and the roof of the autonomous vehicle. The visual display system may be a 360 degree visual display system. The visual display system may be integrated into the autonomous vehicle.

In another implementation, a computer program product resides on a computer readable medium and has a plurality of instructions stored on it. When executed by a processor, the instructions cause the processor to perform operations including: monitoring one or more machine vision sensors to obtain perception information concerning one or more pedestrians proximate an autonomous vehicle; identifying one or more humanoid shapes within the perception information, thus defining one or more detected humanoid shapes; generating proximate object display information that locates the one or more detected humanoid shapes with respect to the autonomous vehicle; and rendering the proximate object display information on a visual display system, thus confirming the perception of the one or more pedestrians by the autonomous vehicle.

One or more of the following features may be included. Identifying one or more humanoid shapes within the perception information may include: comparing one or more defined humanoid shapes to one or more unidentified objects within the perception information to identify one or more humanoid shapes within the perception information. The proximate object display information may include dynamic proximate object display information that changes as the location of the one or more detected humanoid shapes changes with respect to the autonomous vehicle. Rendering the proximate object display information on a visual display system may include: rendering the dynamic proximate object display information on the visual display system, thus dynamically confirming the perception of the one or more pedestrians by the autonomous vehicle. The one of more machine vision sensors may include a LIDAR system. The visual display system may be configured to be mounted on a roof of the autonomous vehicle. The visual display system may be a cylindrical visual display system. The cylindrical visual display system may include: an illuminated portion; and a non-illuminated portion positioned between the illuminated portion and the roof of the autonomous vehicle. The visual display system may be a 360 degree visual display system. The visual display system may be integrated into the autonomous vehicle.

In another implementation, a computing system includes a processor and memory is configured to perform operations including: monitoring one or more machine vision sensors to obtain perception information concerning one or more pedestrians proximate an autonomous vehicle; identifying one or more humanoid shapes within the perception information, thus defining one or more detected humanoid shapes; generating proximate object display information that locates the one or more detected humanoid shapes with respect to the autonomous vehicle; and rendering the proximate object display information on a visual display system, thus confirming the perception of the one or more pedestrians by the autonomous vehicle.

One or more of the following features may be included. Identifying one or more humanoid shapes within the perception information may include: comparing one or more defined humanoid shapes to one or more unidentified objects within the perception information to identify one or more humanoid shapes within the perception information. The proximate object display information may include dynamic proximate object display information that changes as the location of the one or more detected humanoid shapes changes with respect to the autonomous vehicle. Rendering the proximate object display information on a visual display system may include: rendering the dynamic proximate object display information on the visual display system, thus dynamically confirming the perception of the one or more pedestrians by the autonomous vehicle. The one or more machine vision sensors may include a LIDAR system. The visual display system may be configured to be mounted on a roof of the autonomous vehicle. The visual display system may be a cylindrical visual display system. The cylindrical visual display system may include: an illuminated portion; and a non-illuminated portion positioned between the illuminated portion and the roof of the autonomous vehicle. The visual display system may be a 360 degree visual display system. The visual display system may be integrated into the autonomous vehicle.

The details of one or more implementations are set forth in the accompanying drawings and the description below. Other features and advantages will become apparent from the description, the drawings, and the claims.

BRIEF DESCRIPTION OF THE DRAWINGS

FIG. 8 is diagrammatic view of the status indication system of the autonomous vehicle of FIG. 1 according to an embodiment of the present disclosure.

Like reference symbols in the various drawings indicate like elements.

DETAILED DESCRIPTION OF THE PREFERRED EMBODIMENTS

Autonomous Vehicle Overview

Figure 1:
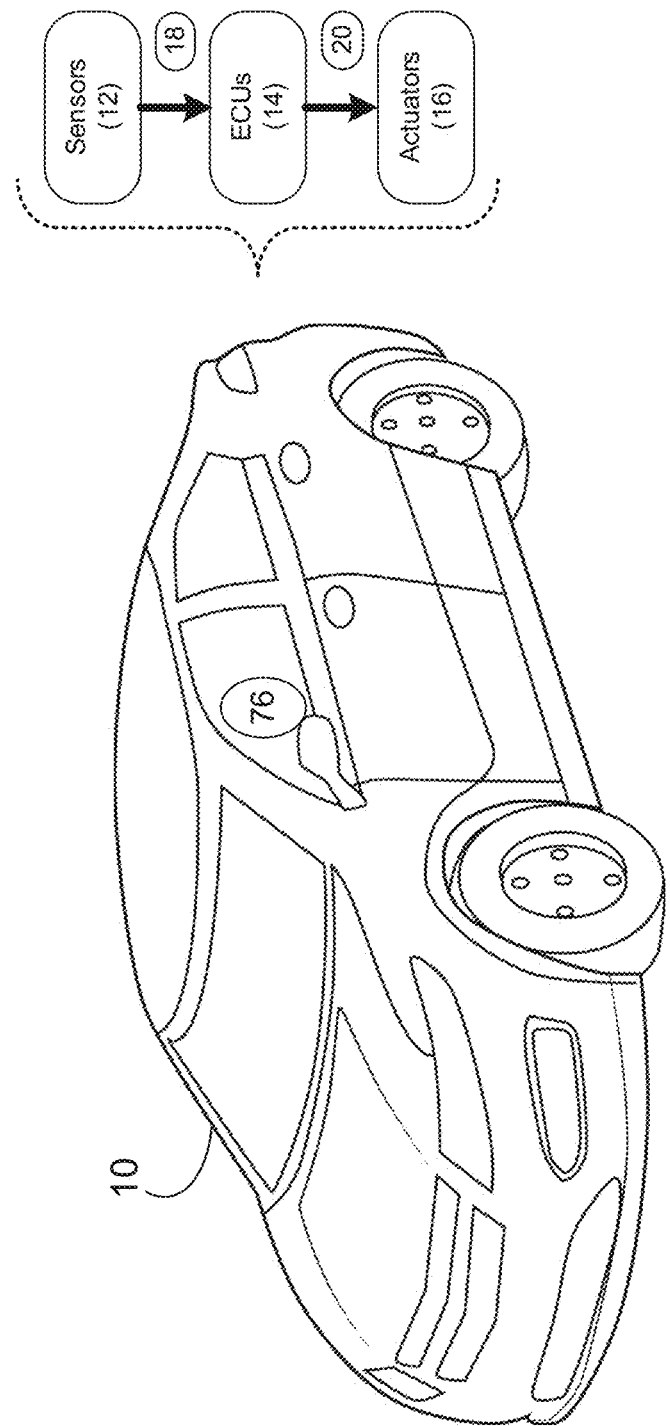
FIG. 1 is a diagrammatic view of an autonomous vehicle according to an embodiment of the present disclosure.

Referring to FIG. 1, there is shown autonomous vehicle 10. As is known in the art, an autonomous vehicle (e.g. autonomous vehicle 10) is a vehicle that is capable of sensing its environment and moving with little or no human input. Autonomous vehicles (e.g. autonomous vehicle 10) may combine a variety of sensor systems to perceive their surroundings, examples of which may include but are not limited to radar, computer vision, LIDAR, GPS, odometry, temperature and inertia, wherein such sensor systems may be configured to interpret lanes and markings on a roadway, street signs, stoplights, pedestrians, other vehicles, roadside objects, hazards, etc.

Autonomous vehicle 10 may include a plurality of sensors (e.g. sensors 12), a plurality of electronic control units (e.g. ECUs 14) and a plurality of actuators (e.g. actuators 16). Accordingly, sensors 12 within autonomous vehicle 10 may monitor the environment in which autonomous vehicle 10 is operating, wherein sensors 12 may provide sensor data 18 to ECUs 14. ECUs 14 may process sensor data 18 to determine the manner in which autonomous vehicle 10 should move. ECUs 14 may then provide control data 20 to actuators 16 so that autonomous vehicle 10 may move in the manner decided by ECUs 14. For example, a machine vision sensor included within sensors 12 may "read" a speed limit sign stating that the speed limit on the road on which autonomous vehicle 10 is traveling is now 35 miles an hour. This machine vision sensor included within sensors 12 may provide sensor data 18 to ECUs 14 indicating that the speed on the road on which autonomous vehicle 10 is traveling is now 35 mph. Upon receiving sensor data 18, ECUs 14 may process sensor data 18 and may determine that autonomous vehicle 10 (which is currently traveling at 45 mph) is traveling too fast and needs to slow down. Accordingly, ECUs 14 may provide control data 20 to actuators 16, wherein control data 20 may e.g. apply the brakes of autonomous vehicle 10 or eliminate any actuation signal currently being applied to the accelerator (thus allowing autonomous vehicle 10 to coast until the speed of autonomous vehicle 10 is reduced to 35 mph).

System Redundancy

As would be imagined, since autonomous vehicle 10 is being controlled by the various electronic systems included therein (e.g. sensors 12, ECUs 14 and actuators 16), the potential failure of one or more of these systems should be considered when designing autonomous vehicle 10 and appropriate contingency plans may be employed.

Figure 2A:
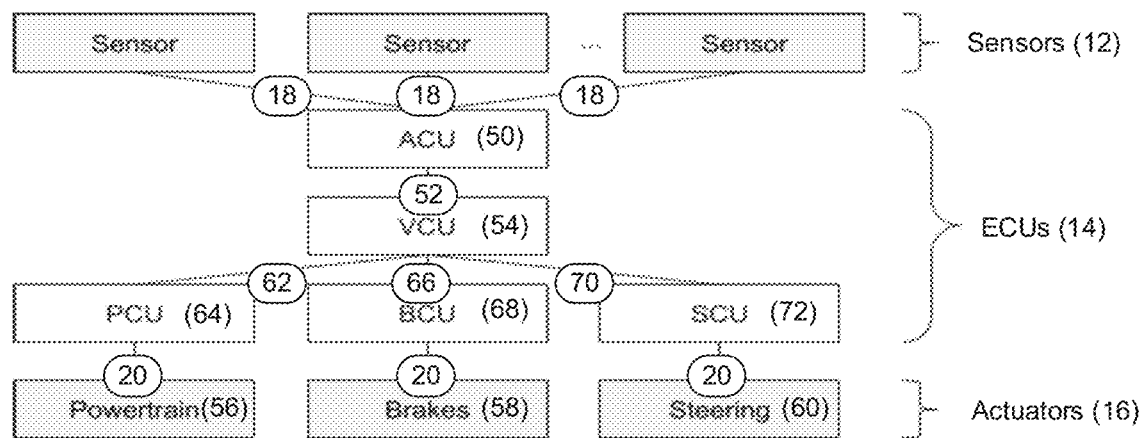
FIG. 2A is a diagrammatic view of one embodiment of the various systems included within the autonomous vehicle of FIG. 1 according to an embodiment of the present disclosure.

For example and referring also to FIG. 2A, the various ECUs (e.g., ECUs 14) that are included within autonomous vehicle 10 may be compartmentalized so that the responsibilities of the various ECUs (e.g., ECUs 14) may be logically grouped. For example, ECUs 14 may include autonomy control unit 50 that may receive sensor data 18 from sensors 12.

Autonomy control unit 50 may be configured to perform various functions. For example, autonomy control unit 50 may receive and process exteroceptive sensor data (e.g., sensor data 18), may estimate the position of autonomous vehicle 10 within its operating environment, may calculate a representation of the surroundings of autonomous vehicle 10, may compute safe trajectories for autonomous vehicle 10, and may command the other ECUs (in particular, a vehicle control unit) to cause autonomous vehicle 10 to execute a desired maneuver. Autonomy control unit 50 may include substantial compute power, persistent storage, and memory.

Accordingly, autonomy control unit 50 may process sensor data 18 to determine the manner in which autonomous vehicle 10 should be operating. Autonomy control unit 50 may then provide vehicle control data 52 to vehicle control unit 54, wherein vehicle control unit 54 may then process vehicle control data 52 to determine the manner in which the individual control systems (e.g. powertrain system 56, braking system 58 and steering system 60) should respond in order to achieve the trajectory defined by autonomous control unit 50 within vehicle control data 52.

Vehicle control unit 54 may be configured to control other ECUs included within autonomous vehicle 10. For example, vehicle control unit 54 may control the steering, powertrain, and brake controller units. For example, vehicle control unit 54 may provide: powertrain control signal 62 to powertrain control unit 64; braking control signal 66 to braking control unit 68; and steering control signal 70 to steering control unit 72.

Powertrain control unit 64 may process powertrain control signal 62 so that the appropriate control data (commonly represented by control data 20) may be provided to powertrain system 56. Additionally, braking control unit 68 may process braking control signal 66 so that the appropriate control data (commonly represented by control data 20) may be provided to braking system 58. Further, steering control unit 72 may process steering control signal 70 so that the appropriate control data (commonly represented by control data 20) may be provided to steering system 60.

Powertrain control unit 64 may be configured to control the transmission (not shown) and engine/traction motor (not shown) within autonomous vehicle 10; while brake control unit 68 may be configured to control the mechanical/regenerative braking system (not shown) within autonomous vehicle 10; and steering control unit 72 may be configured to control the steering column/steering rack (not shown) within autonomous vehicle 10.

Autonomy control unit 50 may be a highly complex computing system that may provide extensive processing capabilities (e.g., a workstation-class computing system with multi-core processors, discrete co-processing units, gigabytes of memory, and persistent storage). In contrast, vehicle control unit 54 may be a much simpler device that may provide processing power equivalent to the other ECUs included within autonomous vehicle 10 (e.g., a computing system having a modest microprocessor (with a CPU frequency of less than 200 megahertz), less than 1 megabyte of system memory, and no persistent storage). Due to these simpler designs, vehicle control unit 54 may have greater reliability and durability than autonomy control unit 50.

To further enhance redundancy and reliability, one or more of the ECUs (ECUs 14) included within autonomous vehicle 10 may be configured in a redundant fashion. For example and referring also to FIG. 2B, there is shown one implementation of ECUs 14 wherein a plurality of vehicle control units are utilized. For example, this particular implementation is shown to include two vehicle control units, namely a first vehicle control unit (e.g., vehicle control unit 54) and a second vehicle control unit (e.g., vehicle control unit 74).

In this particular configuration, the two vehicle control units (e.g. vehicle control units 54, 74) may be configured in various ways. For example, the two vehicle control units (e.g. vehicle control units 54, 74) may be configured in an active—passive configuration, wherein e.g. vehicle control unit 54 performs the active role of processing vehicle control data 52 while vehicle control unit 74 assumes a passive role and is essentially in standby mode. In the event of a failure of vehicle control unit 54, vehicle control unit 74 may transition from a passive role to an active role and assume the role of processing vehicle control data 52. Alternatively, the two vehicle control units (e.g. vehicle control units 54, 74) may be configured in an active—active configuration, wherein e.g. both vehicle control unit 52 and vehicle control unit 74 perform the active role of processing vehicle control data 54 (e.g. divvying up the workload), wherein in the event of a failure of either vehicle control unit 54 or vehicle control unit 74, the surviving vehicle control unit may process all of vehicle control data 52.

Figure 2B:
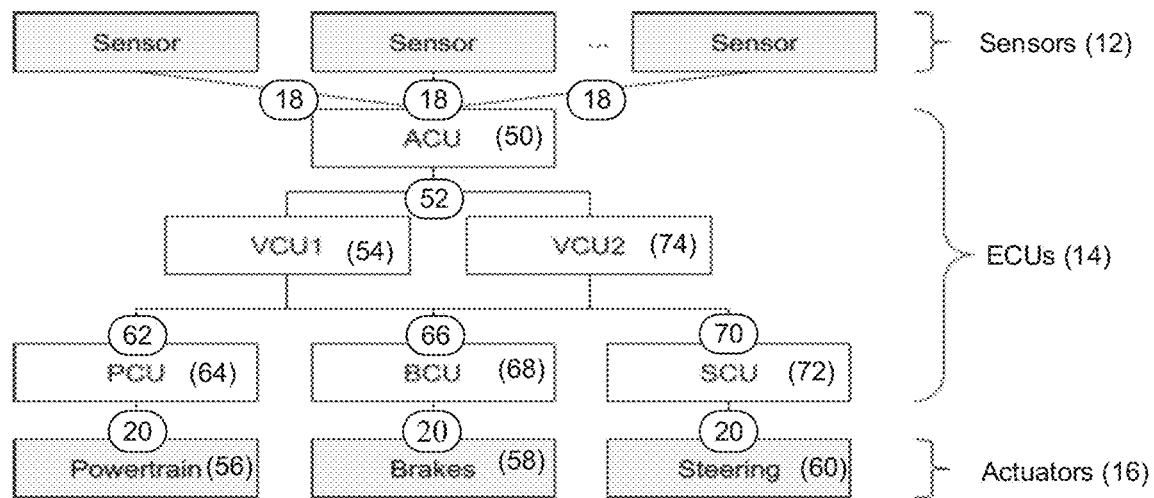
FIG. 2B is a diagrammatic view of another embodiment of the various systems included within the autonomous vehicle of FIG. 1 according to an embodiment of the present disclosure.

While FIG. 2B illustrates one example of the manner in which the various ECUs (e.g. ECUs 14) included within autonomous vehicle 10 may be configured in a redundant fashion, this is for illustrative purposes only and is not intended to be a limitation of this disclosure, as other configurations are possible and are considered to be within the scope of this disclosure. For example, autonomous control unit 50 may be configured in a redundant fashion, wherein a second autonomous control unit (not shown) is included within autonomous vehicle 10 and is configured in an active—passive or active—active fashion. Further, it is foreseeable that one or more of the sensors (e.g., sensors 12) and/or one or more of the actuators (e.g. actuators 16) may be configured in a redundant fashion. Accordingly, it is understood that the level of redundancy achievable with respect to autonomous vehicle 10 may only be limited by the design criteria and budget constraints of autonomous vehicle 10.

Autonomy Computational Subsystems

Figure 3:
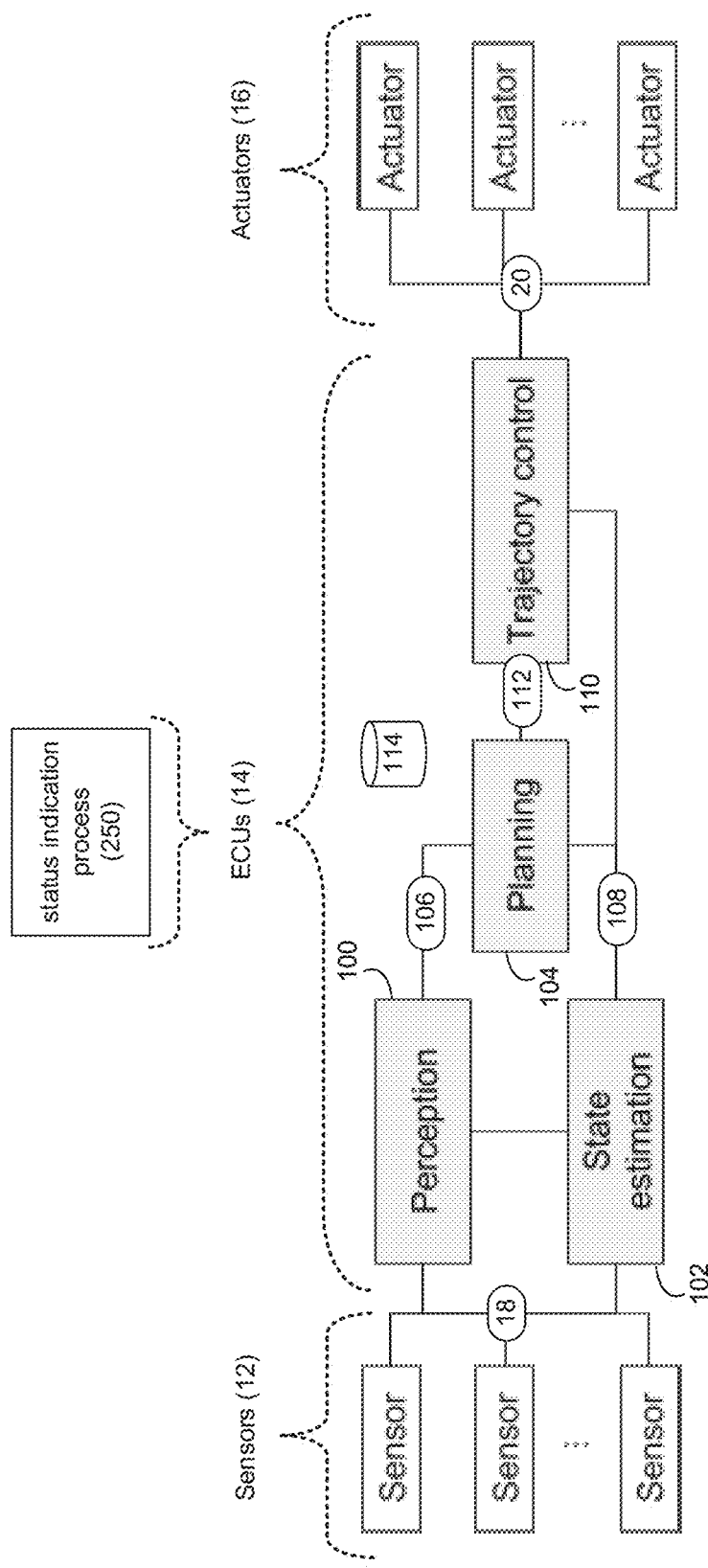
FIG. 3 is a diagrammatic view of another embodiment of the various systems included within the autonomous vehicle of FIG. 1 according to an embodiment of the present disclosure.

Referring also to FIG. 3, the various ECUs of autonomous vehicle 10 may be grouped/arranged/configured to effectuate various functionalities.

For example, one or more of ECUs 14 may be configured to effectuate/form perception subsystem 100. wherein perception subsystem 100 may be configured to process data from onboard sensors (e.g., sensor data 18) to calculate concise representations of objects of interest near autonomous vehicle 10 (examples of which may include but are not limited to other vehicles, pedestrians, traffic signals, traffic signs, road markers, hazards, etc.) and to identify environmental features that may assist in determining the location of autonomous vehicle 10. Further, one or more of ECUs 14 may be configured to effectuate/form state estimation subsystem 102, wherein state estimation subsystem 102 may be configured to process data from onboard sensors (e.g., sensor data 18) to estimate the position, orientation, and velocity of autonomous vehicle 10 within its operating environment. Additionally, one or more of ECUs 14 may be configured to effectuate/form planning subsystem 104, wherein planning subsystem 104 may be configured to calculate a desired vehicle trajectory (using perception output 106 and state estimation output 108). Further still, one or more of ECUs 14 may be configured to effectuate/form trajectory control subsystem 110, wherein trajectory control subsystem 110 uses planning output 112 and state estimation output 108 (in conjunction with feedback and/or feedforward control techniques) to calculate actuator commands (e.g., control data 20) that may cause autonomous vehicle 10 to execute its intended trajectory within it operating environment.

For redundancy purposes, the above-described subsystems may be distributed across various devices (e.g., autonomy control unit 50 and vehicle control units 54, 74).

Additionally/alternatively and due to the increased computational requirements, perception subsystem 100 and planning subsystem 104 may be located almost entirely within autonomy control unit 50, which (as discussed above) has much more computational horsepower than vehicle control units 54, 74. Conversely and due to their lower computational requirements, state estimation subsystem 102 and trajectory control subsystem 110 may be: located entirely on vehicle control units 54, 74 if vehicle control units 54, 74 have the requisite computational capacity; and/or located partially on vehicle control units 54, 74 and partially on autonomy control unit 50. However, the location of state estimation subsystem 102 and trajectory control subsystem 110 may be of critical importance in the design of any contingency planning architecture, as the location of these subsystems may determine how contingency plans are calculated, transmitted, and/or executed.

Status Indication System

Figure 4A:
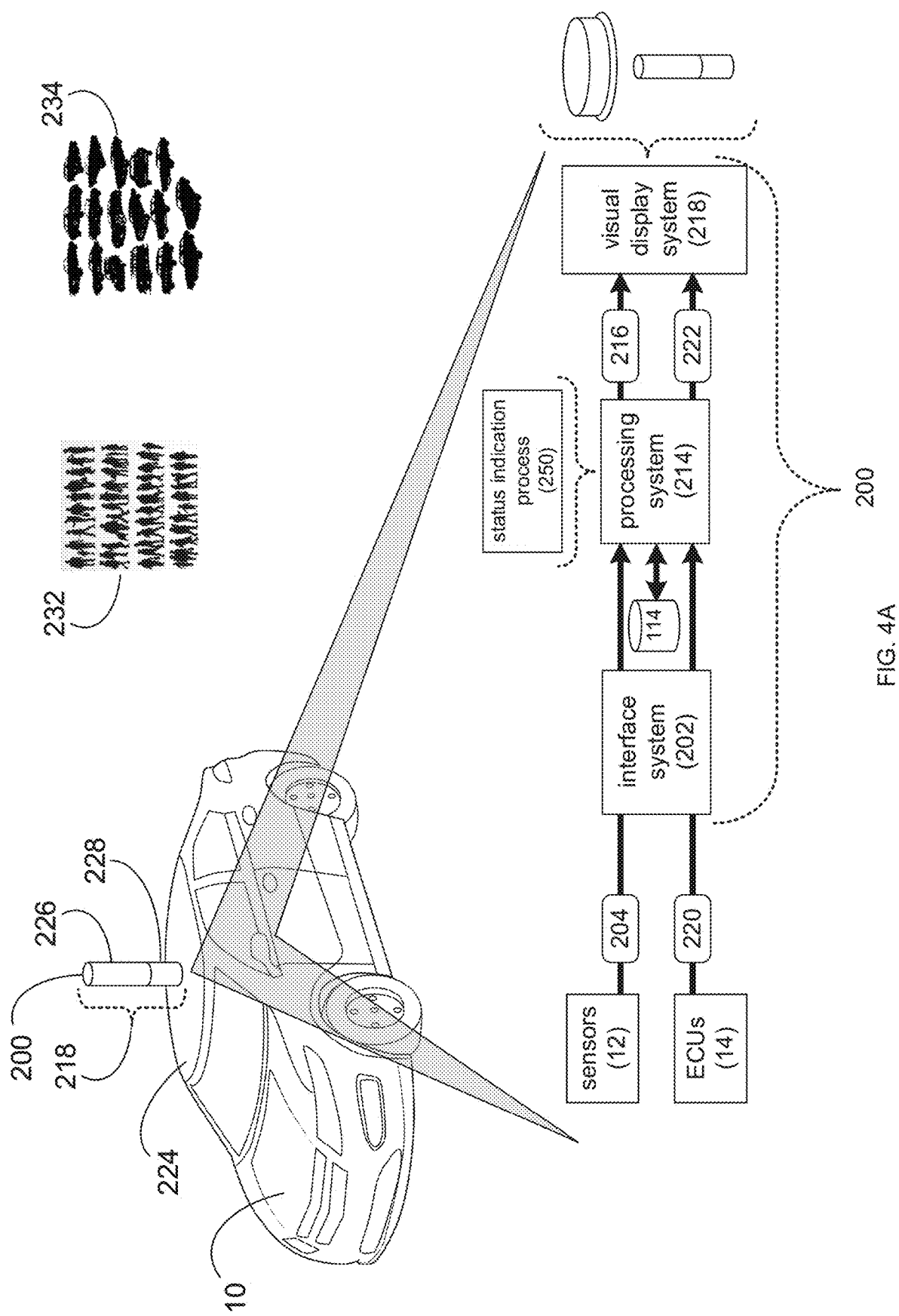
FIGS. 4A-4C are diagrammatic views of a status indication system of the autonomous vehicle of FIG. 1 according to an embodiment of the present disclosure.
Figure 4B:
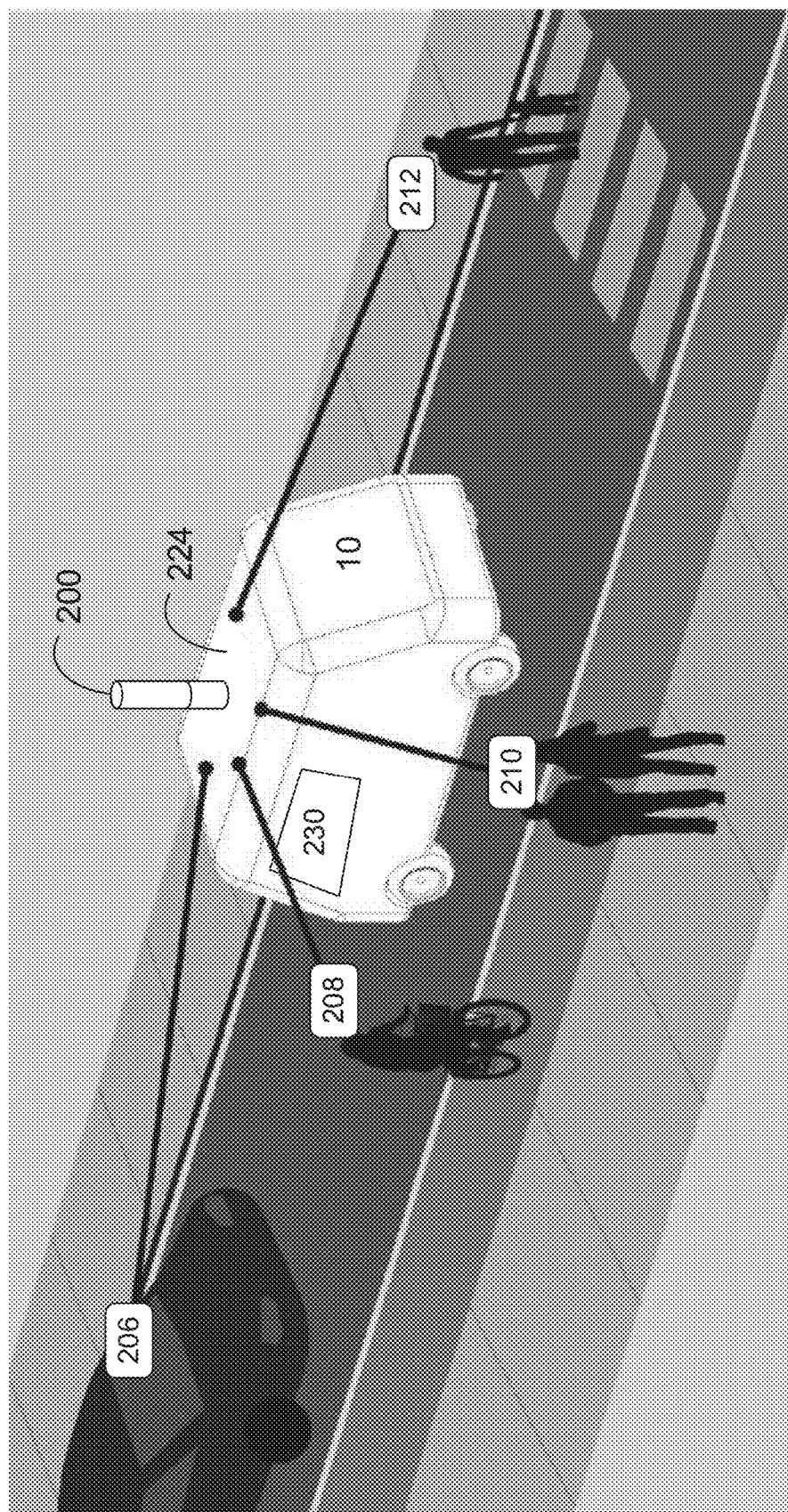
Figure 4C:
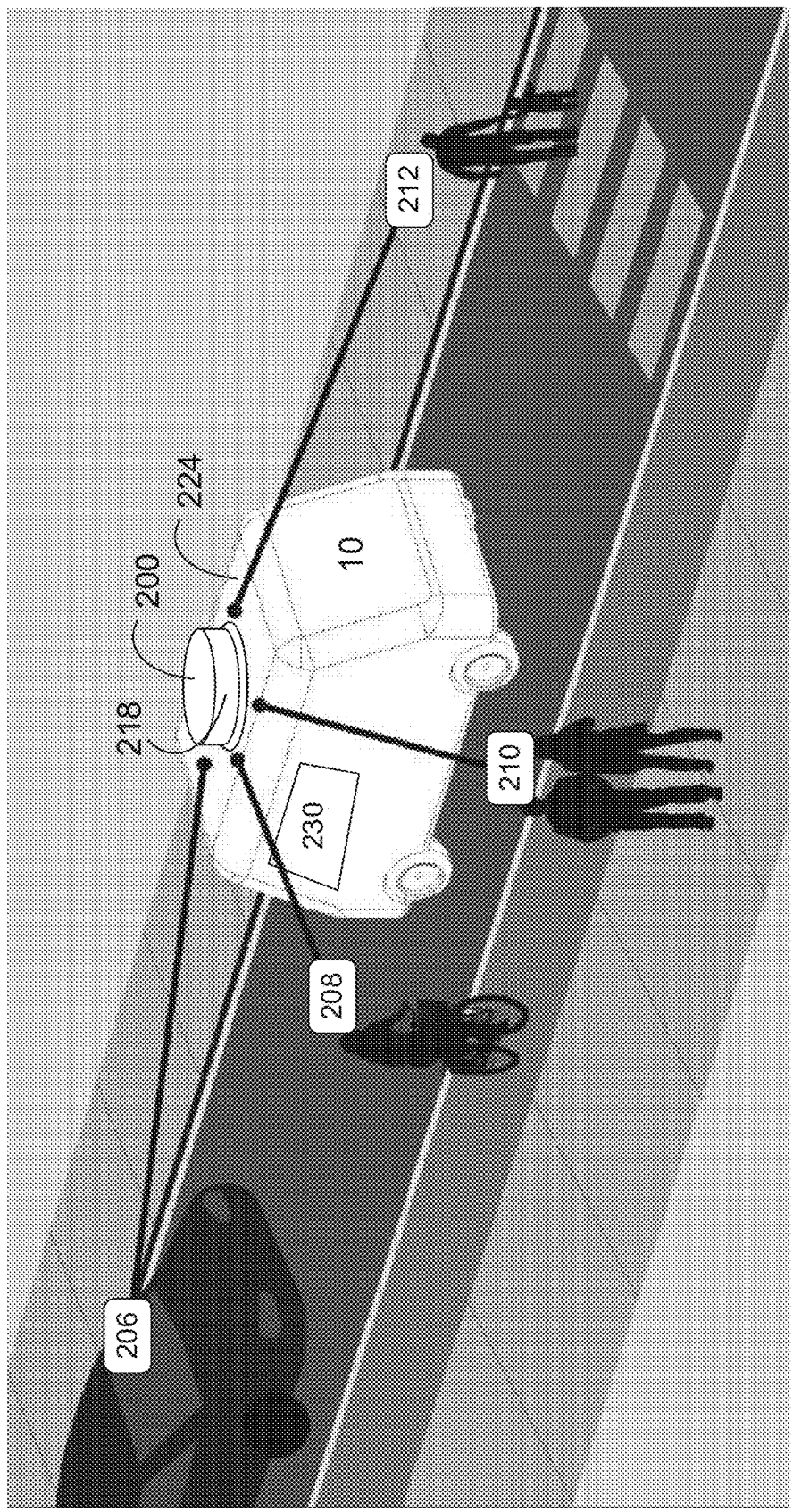

Referring also to FIGS. 4A, 4B, 4C, there is shown an exterior view of autonomous vehicle 10, wherein autonomous vehicle 10 may include status indication system 200 for conveying status information concerning a moveable vehicle (e.g., autonomous vehicle 10).

Status indication system 200 may include an interface system (e.g., interface system 202) configured to receive perception information (e.g., perception information 204) concerning one or more objects (e.g., objects 206, 208, 210, 212) proximate the moveable vehicle (e.g., autonomous vehicle 10). The one or more objects (e.g., objects 206, 208, 210, 212) proximate the moveable vehicle (e.g., autonomous vehicle 10) may include one or more of:

pedestrians (e.g., objects 208, 210, 212) proximate the moveable vehicle (e.g., autonomous vehicle 10), such as people that are walking/passing by autonomous vehicle 10.

third-party vehicles (e.g., object 206) proximate the moveable vehicle (e.g., autonomous vehicle 10), such as other vehicles that are driving/stopped near autonomous vehicle 10.

As discussed above, sensors 12 within autonomous vehicle 10 may monitor the environment in which autonomous vehicle 10 is operating, wherein sensors 12 may provide sensor data 18 to ECUs 14 that may be processed to determine the manner in which autonomous vehicle 10 should operate. Interface system 202 may be configured to interface with sensors 12 (generally) and one of more machine vision sensors (specifically) included within the moveable vehicle (e.g., autonomous vehicle 10). Example of such machine vision sensors may include but are not limited to LIDAR system.

As is known in the art, LIDAR is a method for determining ranges (variable distance) by targeting an object with a laser and measuring the time for the reflected light to return to the receiver. Lidar may also be used to make digital 3-D representations of areas on the earth's surface and ocean bottom, due to differences in laser return times, and by varying laser wavelengths. It has terrestrial, airborne, and mobile applications. Lidar is an acronym of "light detection and ranging" or "laser imaging, detection, and ranging". Lidar sometimes is called 3-D laser scanning, a special combination of a 3-D scanning and laser scanning. Lidar is commonly used to make high-resolution maps, with applications in surveying, geodesy, geomatics, archaeology, geography, geology, geomorphology, seismology, forestry, atmospheric physics, laser guidance, airborne laser swath mapping (ALSM), and laser altimetry. The technology is also used in control and navigation for some autonomous cars.

Status indication system 200 may include a processing system (e.g., processing system 214) configured to process the perception information (e.g., perception information 204) to generate proximate object display information (e.g., proximate object display information 216). Processing system 214 may be configured in various fashions. One example of processing system 214 may include a stand-alone processing system that includes one or more processors (not shown) and one or more memory architectures (not shown). Another example of processing system 214 may include a portion of ECUs 14. Processing system 214 may be coupled to a storage device (e.g., storage device 114). Examples of storage device 114 may include but are not limited to: a hard disk drive; a RAID device; a random-access memory (RAM); a read-only memory (ROM); and all forms of flash memory storage devices.

Status indication system 200 may include a visual display system (e.g., visual display system 218) configured to render the proximate object display information (e.g., proximate object display information 216). As will be discussed below in greater detail, the visual display system (e.g., visual display system 218) may be configured to convey the status information concerning autonomous vehicle 10 in a visual fashion that is easily understandable to people proximate autonomous vehicle 10.

Additionally, the interface system (e.g., interface system 202) may be configured to receive moveable vehicle status information (e.g., moveable vehicle status information 220). As stated above, sensors 12 within autonomous vehicle 10 may monitor the environment in which autonomous vehicle 10 is operating, wherein sensors 12 may provide sensor data 18 to ECUs 14. Accordingly, the interface system (e.g., interface system 202) may obtain such moveable vehicle status information (e.g., moveable vehicle status information 220) from ECUs 14.

Accordingly, the moveable vehicle status information (e.g., moveable vehicle status information 220) may identify one or more of the following:

Whether the moveable vehicle is decelerating;
Whether the moveable vehicle is accelerating;
Whether the moveable vehicle is stationary; and
Whether the moveable vehicle is turning:

The processing system (e.g., processing system 214) may be configured to process the moveable vehicle status information (e.g., moveable vehicle status information 220) to generate vehicle status display information (e.g., vehicle status display information 222), wherein the visual display system (e.g., visual display system 218) may be configured to render the vehicle status display information (e.g., vehicle status display information 222). As will be discussed below in greater detail, the visual display system (e.g., visual display system 218) may be configured to convey the status information concerning autonomous vehicle 10 in a visual fashion that is easily understandable to people proximate autonomous vehicle 10.

The visual display system (e.g., visual display system 218) may be configured to be mounted on a roof (e.g., roof 224) of the moveable vehicle (e.g., autonomous vehicle 10). The visual display system (e.g., visual display system 218) may be configured in various fashions, all of which are considered to be within the scope of this disclosure.

Cylindrical: The visual display system (e.g., visual display system 218) may be a cylindrical visual display system (as shown in FIGS. 4A-4B). When visual display system 218 is configured in a cylindrical fashion, visual display system 218 may include: an illuminated portion (e.g., illuminated portion 226); and a non-illuminated portion (non-illuminated portion 228) positioned between the illuminated portion (e.g., illuminated portion 226) and the roof (e.g., roof 224) of the moveable vehicle (e.g., autonomous vehicle 10), thus providing a "hovering" appearance with respect to the roof (e.g., roof 224) of the moveable vehicle (e.g., autonomous vehicle 10).

Disk-Shaped: The visual display system (e.g., visual display system 218) may be a disk-shaped visual display system (as shown in FIG. 4C). When visual display system 218 is configured in a disk-shaped fashion, visual display system 218 may be generally illuminated proximate the roof (e.g., roof 224) of the moveable vehicle (e.g., autonomous vehicle 10), thus providing a lower profile that may be desirable when used on higher profile vehicles (such as SUVs and vans).

Regardless of configuration, the visual display system (e.g., visual display system 218) may be a 360 degree visual display system, thus conveying the status information concerning autonomous vehicle 10 in a visual fashion regardless of where the people are positioned proximate autonomous vehicle 10.

While the visual display system (e.g., visual display system 218) is described above as being mounted on a roof (e.g., roof 224) of the moveable vehicle (e.g., autonomous vehicle 10), this is for illustrative purposes only and is not intended to be a limitation of this disclosure, as other configurations are possible and are considered to be within the scope of this disclosure. For example, the visual display system (e.g., visual display system 218) may be integrated into the moveable vehicle (e.g., autonomous vehicle 10) in various fashions. Accordingly, the visual display system (e.g., visual display system 218) may be a portion of (or incorporated within) a window (e.g., window 230) of the moveable vehicle (e.g., autonomous vehicle 10).

Status Indication Process (for Pedestrians)

As discussed above, the visual display system (e.g., visual display system 218) may be configured to convey status information concerning autonomous vehicle 10 in a visual fashion that is easily understandable to people proximate autonomous vehicle 10.

Figure 5:
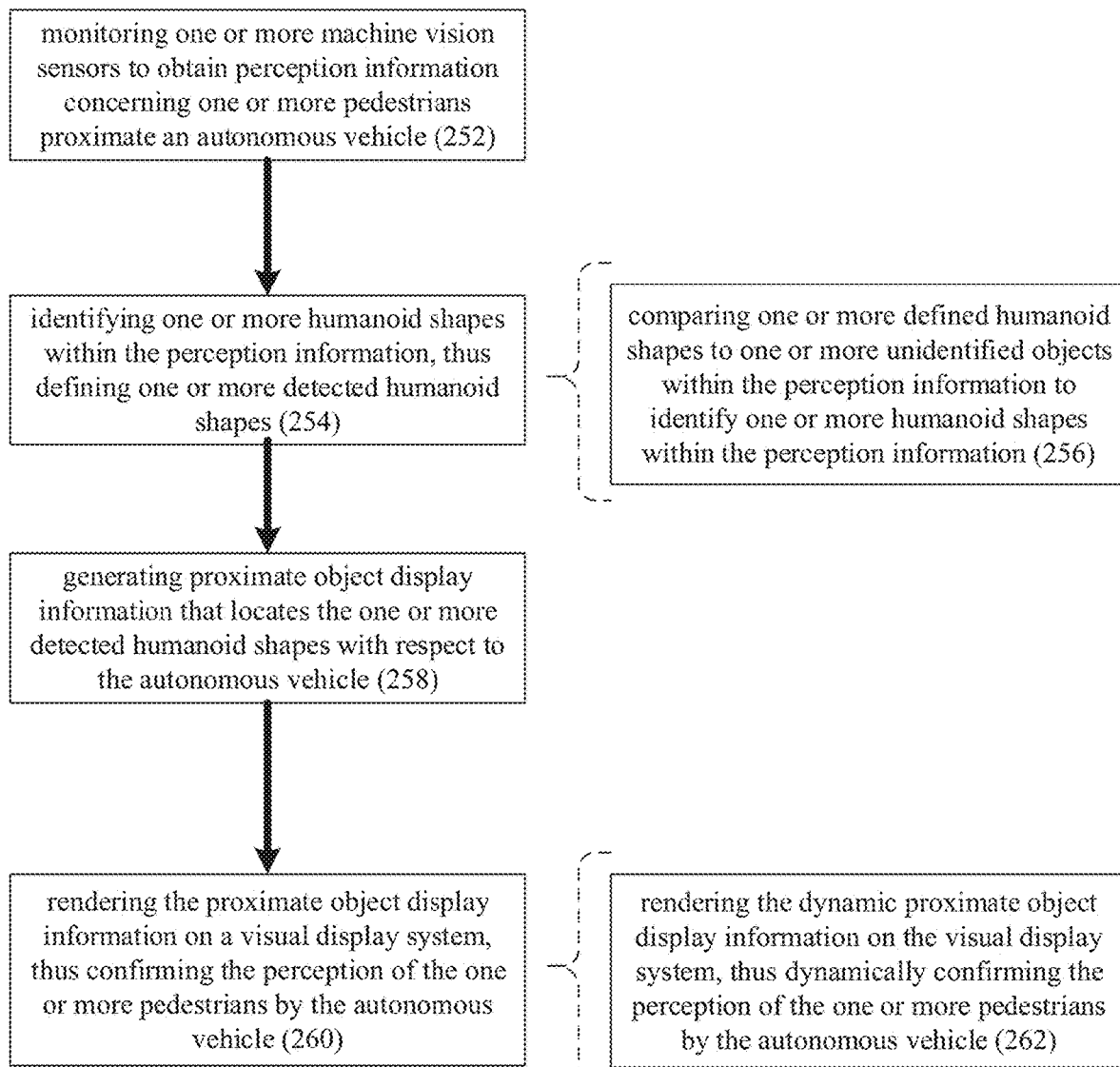
FIG. 5 is a flowchart of one implementation of a status indication process executed on one or more systems of the autonomous vehicle of FIG. 1 according to an embodiment of the present disclosure.

Referring also to FIG. 5 and in order to convey such status information in such a visual fashion, processing system 214 may execute status indication process 250. As discussed above, processing system 214 may be configured in various fashions, examples of which may include but are not limited to:

as a stand-alone processing system that includes one or more processors (not shown) and one or more memory architectures (not shown); and/or as a portion of ECUs 14.

The instruction sets and subroutines of status indication process 250, which may be stored on storage device 114 coupled to ECUs 14, may be executed by one or more processors (not shown) and one or more memory architectures (not shown) included within ECUs 14. Examples of storage device 114 may include but are not limited to: a hard disk drive; a RAID device; a random-access memory (RAM); a read-only memory (ROM); and all forms of flash memory storage devices.

Status indication process 250 may be executed on a single ECU or may be executed collaboratively across multiple ECUs. For example, status indication process 250 may be executed solely by autonomy control unit 50, vehicle control unit 54 or vehicle control unit 74. Alternatively, status indication process 250 may be executed collaboratively across the combination of autonomy control unit 50, vehicle control unit 54 and vehicle control unit 74. Accordingly and in the latter configuration, in the event of a failure of one of autonomy control unit 50, vehicle control unit 54 or vehicle control unit 74, the surviving control unit(s) may continue to execute status indication process 250.

Status indication process 250 may monitor 252 one or more machine vision sensors (e.g., sensors 12 generally and a LIDAR sensor specifically) to obtain perception information (e.g., perception information 204) concerning one or more pedestrians (e.g., objects 208, 210, 212) proximate an autonomous vehicle (e.g., autonomous vehicle 10). Perception information 204 may be a three-dimensional image that generally identifies all objects in geographic proximity of autonomous vehicle 10.

Status indication process 250 may identify 254 one or more humanoid shapes within the perception information (e.g., perception information 204), thus defining one or more detected humanoid shapes. When identifying 254 one or more humanoid shapes within the perception information (e.g., perception information 204), status indication process 250 may compare 256 one or more defined humanoid shapes (e.g., defined humanoid shapes 232) to one or more unidentified objects within the perception information (e.g., perception information 204) to identify one or more humanoid shapes within the perception information (e.g., perception information 204).

Defined humanoid shapes 232 may be manually-defined (e.g., via a designer/programmer of status indication process 250) and/or automatically-defined (e.g., via Artificial Intelligence/Machine Learning (AI/ML) in a fashion similar to the manner in which AI/ML can identify human faces within photographs). Generally speaking, perception information 204 may be a three-dimensional image that generally identifies a plurality of unidentified objects that are in geographic proximity of autonomous vehicle 10. Accordingly, status indication process 250 may compare 256 defined humanoid shapes 232 to one or more unidentified objects within the perception information (e.g., perception information 204) to identify one or more humanoid shapes within the perception information (e.g., perception information 204).

Once the humanoid shapes are identified 254 within perception information 204, status indication process 250 may generate 258 proximate object display information (e.g., proximate object display information 216) that locates the one or more detected humanoid shapes with respect to the autonomous vehicle (e.g., autonomous vehicle 10). Status indication process 250 may then render 260 the proximate object display information (e.g., proximate object display information 216) on a visual display system (e.g., visual display system 218), thus confirming the perception of the one or more pedestrians (e.g., objects 208, 210, 212) by the autonomous vehicle (e.g., autonomous vehicle 10).

Figure 6A:
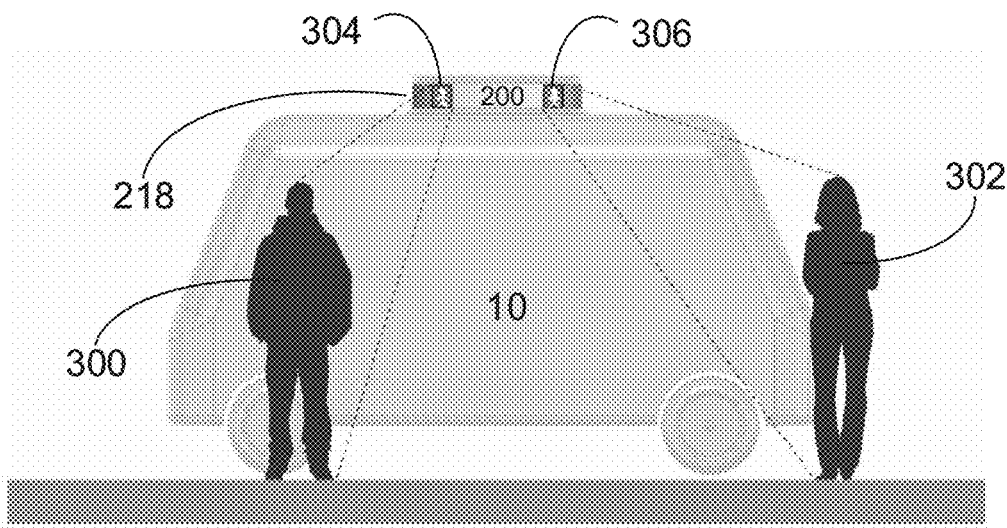
FIGS. 6A-6C are diagrammatic views of the status indication system of the autonomous vehicle of FIG. 1 according to an embodiment of the present disclosure.

For example, FIG. 6A illustrates a situation in which two pedestrians (e.g., pedestrians 300, 302) are standing stationary proximate the side of autonomous vehicle 10. Accordingly, proximate object display information 216 may locate the one or more detected humanoid shapes (e.g., pedestrians 300, 302) with respect to autonomous vehicle 10. Further, visual display system 218 of status indication system 200 may convey status information concerning autonomous vehicle 10 in a visual fashion that is easily understandable to people (e.g., pedestrians 300, 302) proximate autonomous vehicle 10. Accordingly, visual display system 218 may render a first indicator (e.g., indicator 304) that is pointing to (or corresponds with) pedestrian 300. As pedestrian 300 is stationary, indicator 304 may be stationary within visual display system 302. Further, visual display system 218 may render a second indicator (e.g., indicator 306) that is pointing to (or corresponds with) pedestrian 302. As pedestrian 302 is stationary, indicator 306 may be stationary within visual display system 302.

Figure 6B:
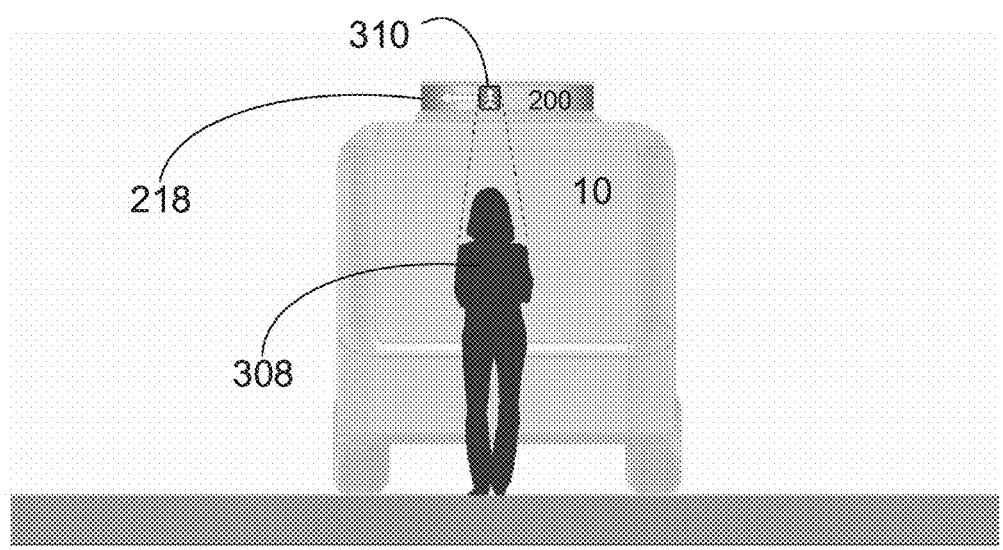

Further, FIG. 6B illustrates a situation in which one pedestrian (e.g., pedestrian 300, 308) is standing stationary proximate the front of autonomous vehicle 10. Accordingly, proximate object display information 216 may locate the one or more detected humanoid shapes (e.g., pedestrian 308) with respect to autonomous vehicle 10. Further, visual display system 218 of status indication system 200 may convey status information concerning autonomous vehicle 10 in a visual fashion that is easily understandable to people (e.g., pedestrian 308) proximate autonomous vehicle 10. Accordingly, visual display system 218 may render an indicator (e.g., indicator 310) that is pointing to (or corresponds with) pedestrian 308. As pedestrian 308 is stationary, indicator 310 may be stationary within visual display system 302. Further, as pedestrian 310 is in the path of (i.e., obstructing) autonomous vehicle 10, indicator 310 may provide instructions to pedestrian 310 in the form of e.g., the leftward-facing arrow that is asking pedestrian 308 to move to the left and out of the path of autonomous vehicle 10.

The proximate object display information (e.g., proximate object display information 216) may include dynamic proximate object display information (e.g., proximate object display information 216) that changes as the location of the one or more detected humanoid shapes changes with respect to the autonomous vehicle (e.g., autonomous vehicle 10). Accordingly and when rendering 260 the proximate object display information (e.g., proximate object display information 216) on a visual display system (e.g., visual display system 218), status indication process 250 may render 262 the dynamic proximate object display information (e.g., proximate object display information 216) on the visual display system (e.g., visual display system 218), thus dynamically confirming the perception of the one or more pedestrians (e.g., objects 208, 210, 212) by the autonomous vehicle (e.g., autonomous vehicle 10).

Figure 6C:
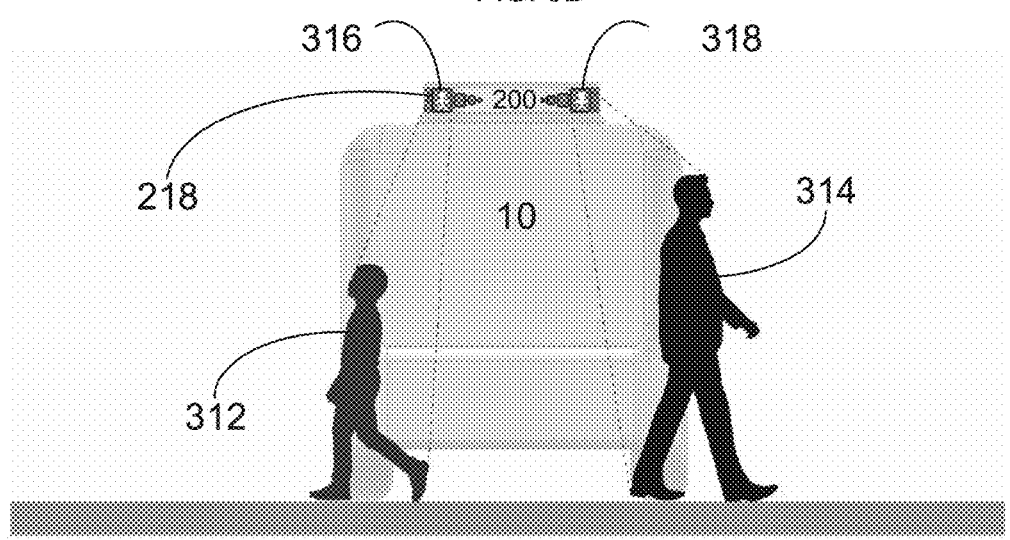

For example, FIG. 6C illustrates a situation in which two pedestrians (e.g., pedestrians 312, 314) are walking in front of autonomous vehicle 10. Accordingly, proximate object display information 216 may locate the one or more detected humanoid shapes (e.g., pedestrians 312, 314) with respect to autonomous vehicle 10. Further, visual display system 218 of status indication system 200 may convey status information concerning autonomous vehicle 10 in a visual fashion that is easily understandable to people (e.g., pedestrians 312, 314) proximate autonomous vehicle 10. Accordingly, visual display system 218 may render a first indicator (e.g., indicator 316) that is pointing to (or corresponds with) pedestrian 312. As pedestrian 312 is moving right to left, indicator 316 may also move right to left within visual display system 302. Further, visual display system 218 may render a second indicator (e.g., indicator 318) that is pointing to (or corresponds with) pedestrian 314. As pedestrian 314 is moving left to right, indicator 318 may also move left to right within visual display system 302.

Status Indication Process (for Vehicles)

In a fashion similar to the manner in which status indication process 10 tracks pedestrians proximate an autonomous vehicle (e.g., autonomous vehicle 10), status indication process 10 may also track vehicles proximate an autonomous vehicle (e.g., autonomous vehicle 10).

Figure 7:
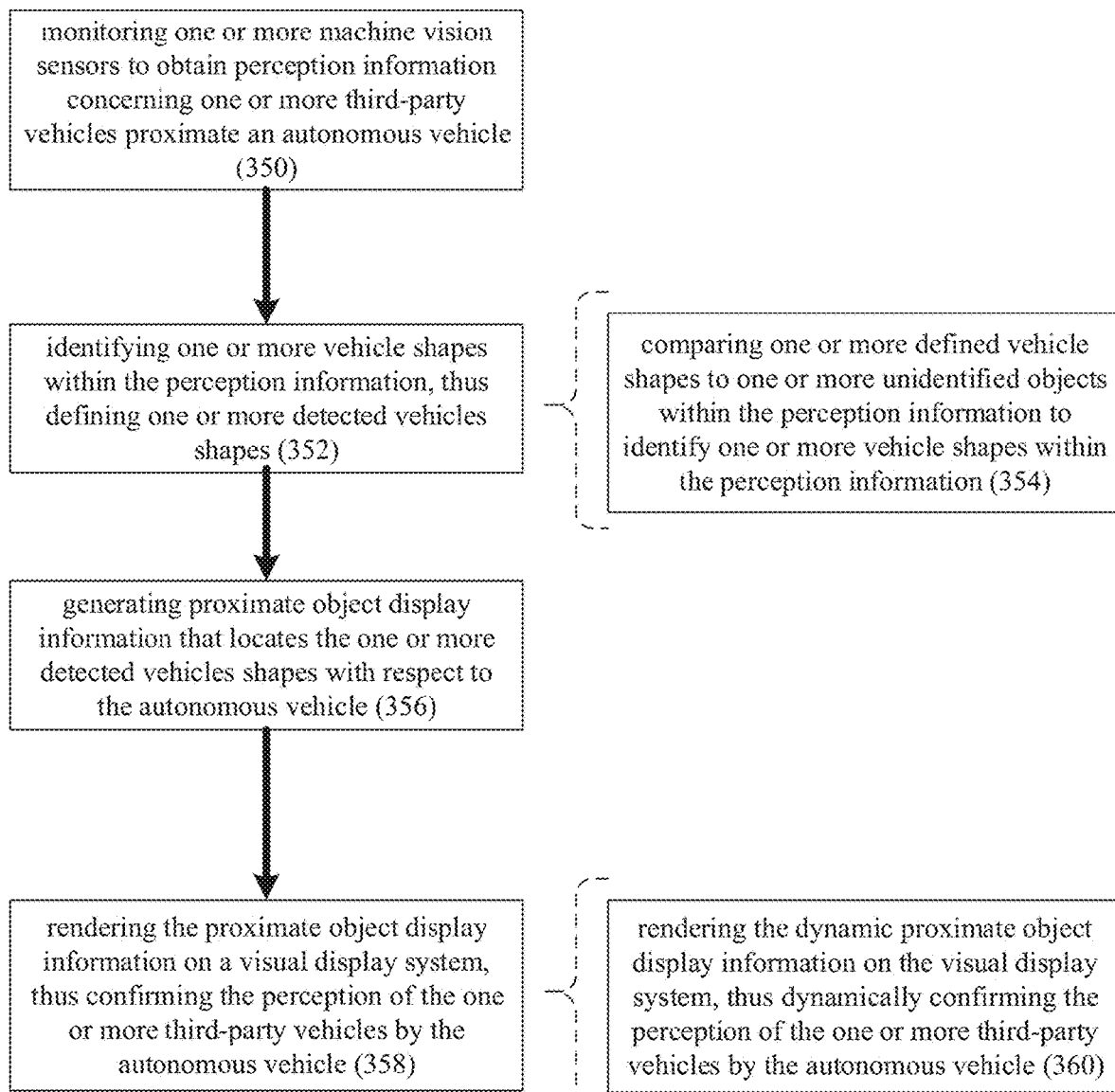
FIG. 7 is a flowchart of another implementation of a status indication process executed on one or more systems of the autonomous vehicle of FIG. 1 according to an embodiment of the present disclosure.

For example and referring also to FIG. 7, status indication process 250 may monitor 350 one or more machine vision sensors (e.g., sensors 12 generally and a LIDAR sensor specifically) to obtain perception information (e.g., perception information 204) concerning one or more third-party vehicles (e.g., object 206) proximate an autonomous vehicle (e.g., autonomous vehicle 10).

Status indication process 250 may identify 352 one or more vehicle shapes within the perception information (e.g., perception information 204), thus defining one or more detected vehicles shapes. When identifying 352 one or more vehicle shapes within the perception information (e.g., perception information 204), status indication process 250 may compare 354 one or more defined vehicle shapes (e.g., defined vehicle shapes 234) to one or more unidentified objects within the perception information (e.g., perception information 204) to identify one or more vehicle shapes within the perception information (e.g., perception information 204).

Defined vehicle shapes 234 may be manually-defined (e.g., via a designer/programmer of status indication process 250) and/or automatically-defined (e.g., via Artificial Intelligence/Machine Learning (AI/ML) in a fashion similar to the manner in which AI/ML can identify vehicles within photographs). Generally speaking, perception information 204 may be a three-dimensional image that generally identifies a plurality of unidentified objects that are in geographic proximity of autonomous vehicle 10. Accordingly, status indication process 250 may compare 354 defined vehicle shapes 234 to one or more unidentified objects within the perception information (e.g., perception information 204) to identify one or more vehicle shapes within the perception information (e.g., perception information 204).

Once the vehicle shapes are identified 352 within perception information 204, status indication process 250 may generate 356 proximate object display information (e.g., proximate object display information 216) that locates the one or more detected vehicles shapes with respect to the autonomous vehicle (e.g., autonomous vehicle 10). Status indication process 250 may then render 358 the proximate object display information (e.g., proximate object display information 216) on a visual display system (e.g., visual display system 218), thus confirming the perception of the one or more third-party vehicles (e.g., object 206) by the autonomous vehicle (e.g., autonomous vehicle 10).

The proximate object display information (e.g., proximate object display information 216) may include dynamic proximate object display information (e.g., proximate object display information 216) that changes as the location of the one or more detected vehicle shapes changes with respect to the autonomous vehicle (e.g., autonomous vehicle 10). Accordingly and when rendering 358 the proximate object display information (e.g., proximate object display information 216) on a visual display system (e.g., visual display system 218), status indication process 250 may render 360 the dynamic proximate object display information (e.g., proximate object display information 216) on the visual display system (e.g., visual display system 218), thus dynamically confirming the perception of the one or more third-party vehicles (e.g., object 206) by the autonomous vehicle (e.g., autonomous vehicle 10).

As shown on FIGS. 6A, 6B, 6C, visual display system 218 may render various indicators (e.g., indicators 304, 306, 310, 316, 318), wherein each of these indicators (e.g., indicators 304, 306, 310, 316, 318) is shown to include e.g., a "stick figure" that indicates that the indicator (e.g., indicators 304, 306, 310, 316, 318) is pointing to (or corresponds with) a pedestrian (e.g., pedestrians 300, 302, 308, 312, 314). Accordingly and referring also to FIG. 8, when status indication process 10 is tracking vehicles proximate autonomous vehicle 10, visual display system 218 may render various indicators (e.g., indicator 320) that includes e.g., a "car figure" that is indicative of the indicator (e.g., indicator 320) pointing to (or corresponds with) a vehicle (e.g., third-party vehicle 322).

Status Indication Process (for AV Status)

As discussed above, the interface system (e.g., interface system 202) may be configured to receive moveable vehicle status information (e.g., moveable vehicle status information 220), wherein this moveable vehicle status information (e.g., moveable vehicle status information 220) may identify one or more of the following:

Whether the moveable vehicle is decelerating;
Whether the moveable vehicle is accelerating;
Whether the moveable vehicle is stationary; and
Whether the moveable vehicle is turning:

The processing system (e.g., processing system 214) may be configured to process the moveable vehicle status information (e.g., moveable vehicle status information 220) to generate vehicle status display information (e.g., vehicle status display information 222), wherein the visual display system (e.g., visual display system 218) may be configured to render the vehicle status display information (e.g., vehicle status display information 222).

Figure 9A:
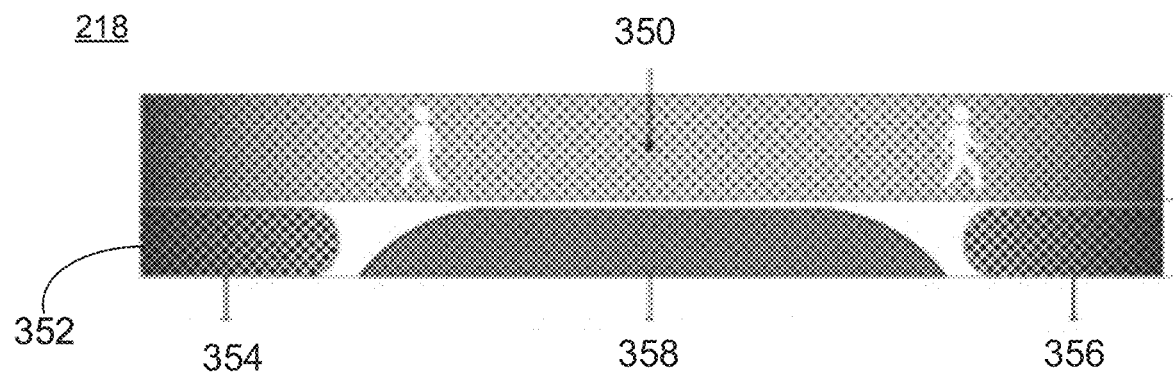
FIGS. 9A-9B are diagrammatic views of the status indication system of the autonomous vehicle of FIG. 1 according to an embodiment of the present disclosure.

Accordingly and as shown in FIG. 9A, proximate object portion 350 of visual display system 218 may be configured to track pedestrians proximate an autonomous vehicle (e.g., autonomous vehicle 10). Further, status portion 352 of visual display system 218 may be configured to render vehicle status display information 222. For example, status portion 352 may include:

"turning left" section 354, which may illuminate when autonomous vehicle 10 is planning on turning left.
"turning right" section 356, which may illuminate when autonomous vehicle 10 is planning on turning right.
status section 358, which may indicate whether autonomous vehicle 10 is:
  i. cruising at a steady state by e.g., displaying solid white,
  ii. accelerating by e.g., displaying a color that varies from white to intense green,
  iii. decelerating by e.g., displaying a color that varies from white to intense red, and
  iv. stationary by e.g., displaying solid red.

Figure 9B:
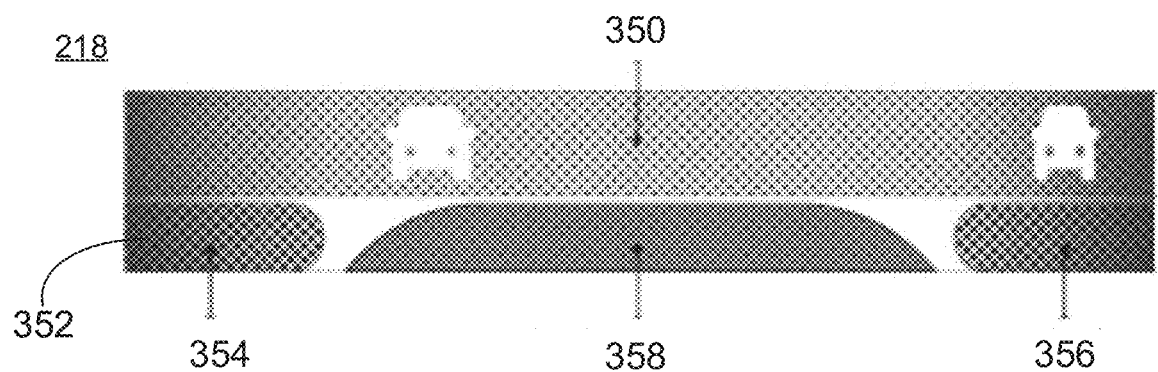

Additionally and as shown in FIG. 9B, proximate object portion 350 of visual display system 218 may be configured to track third-party vehicles proximate an autonomous vehicle (e.g., autonomous vehicle 10). Again, status portion 352 of visual display system 218 may be configured to render vehicle status display information 222 (as described above).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, the computer-implemented method comprising:
   equipping an autonomous vehicle with one or more machine vision sensors;
   monitoring the one or more machine vision sensors to obtain perception information concerning one or more pedestrians proximate the autonomous vehicle;
   identifying one or more humanoid shapes within the perception information, thus defining one or more detected humanoid shapes;
   generating proximate object display information that locates the one or more detected humanoid shapes with respect to the autonomous vehicle;
   rendering the proximate object display information on a visual display system of the autonomous vehicle, thus confirming perception of the one or more pedestrians proximate the autonomous vehicle to the one or more pedestrians proximate the autonomous vehicle, wherein the rendered proximate object display information comprises one or more pedestrian figures representing the one or more pedestrians proximate the autonomous vehicle; and
   rendering instructions on the visual display system of the autonomous vehicle, the instructions instructing the one or more pedestrians proximate the autonomous vehicle to move in a particular direction, wherein the particular direction is indicated via an arrow.

2. The computer-implemented method of claim 1 wherein identifying the one or more humanoid shapes within the perception information includes:
   comparing one or more defined humanoid shapes to one or more unidentified objects within the perception information to identify the one or more humanoid shapes within the perception information.

3. The computer-implemented method of claim 1 wherein the proximate object display information includes dynamic proximate object display information that changes as the location of the one or more detected humanoid shapes changes with respect to the autonomous vehicle.

4. The computer-implemented method of claim 3 wherein rendering the proximate object display information on the visual display system includes:
   rendering the dynamic proximate object display information on the visual display system, thus dynamically confirming the perception of the one or more pedestrians by the autonomous vehicle.

5. The computer-implemented method of claim 1 wherein the one of more machine vision sensors includes a LIDAR system.

6. The computer-implemented method of claim 1 wherein the visual display system is configured to be mounted on a roof of the autonomous vehicle.

7. The computer-implemented method of claim 1 wherein the visual display system is a cylindrical visual display system.

8. The computer-implemented method of claim 7 wherein the cylindrical visual display system includes:
   an illuminated portion; and
   a non-illuminated portion positioned between the illuminated portion and a roof of the autonomous vehicle.

9. The computer-implemented method of claim 1 wherein the visual display system is a 360 degree visual display system.

10. The computer-implemented method of claim 1 wherein the visual display system is integrated into the autonomous vehicle.

11. A computer program product residing on a computer readable medium having a plurality of instructions stored thereon which, when executed by a processor, cause the processor to perform operations, the computer program product comprising:
equipping an autonomous vehicle with one or more machine vision sensors;
monitoring the one or more machine vision sensors to obtain perception information concerning one or more pedestrians proximate the autonomous vehicle;
identifying one or more humanoid shapes within the perception information, thus defining one or more detected humanoid shapes;
generating proximate object display information that locates the one or more detected humanoid shapes with respect to the autonomous vehicle;
rendering the proximate object display information on a visual display system of the autonomous vehicle, thus confirming perception of the one or more pedestrians proximate the autonomous vehicle to the one or more pedestrians proximate the autonomous vehicle, wherein the rendered proximate object display information comprises one or more pedestrian figures representing the one or more pedestrians proximate the autonomous vehicle; and
rendering instructions on the visual display system of the autonomous vehicle, the instructions instructing the one or more pedestrians proximate the autonomous vehicle to move in a particular direction, wherein the particular direction is indicated via an arrow.

12. The computer program product of claim 11 wherein identifying the one or more humanoid shapes within the perception information includes:
comparing one or more defined humanoid shapes to one or more unidentified objects within the perception information to identify the one or more humanoid shapes within the perception information.

13. The computer program product of claim 11 wherein the proximate object display information includes dynamic proximate object display information that changes as the location of the one or more detected humanoid shapes changes with respect to the autonomous vehicle.

14. The computer program product of claim 13 wherein rendering the proximate object display information on the visual display system includes:
rendering the dynamic proximate object display information on the visual display system, thus dynamically confirming the perception of the one or more pedestrians by the autonomous vehicle.

15. The computer program product of claim 11 wherein the one of more machine vision sensors includes a LIDAR system.

16. The computer program product of claim 11 wherein the visual display system is configured to be mounted on a roof of the autonomous vehicle.

17. The computer program product of claim 11 wherein the visual display system is a cylindrical visual display system.

18. The computer program product of claim 17 wherein the cylindrical visual display system includes:
an illuminated portion; and
a non-illuminated portion positioned between the illuminated portion and a roof of the autonomous vehicle.

19. The computer program product of claim 11 wherein the visual display system is a 360 degree visual display system.

20. The computer program product of claim 11 wherein the visual display system is integrated into the autonomous vehicle.

21. A computing system including a processor and memory configured to perform operations, the computing system comprising:
equipping an autonomous vehicle with one or more machine vision sensors;
monitoring the one or more machine vision sensors to obtain perception information concerning one or more pedestrians proximate the autonomous vehicle;
identifying one or more humanoid shapes within the perception information, thus defining one or more detected humanoid shapes;
generating proximate object display information that locates the one or more detected humanoid shapes with respect to the autonomous vehicle;
rendering the proximate object display information on a visual display system of the autonomous vehicle, thus confirming perception of the one or more pedestrians proximate the autonomous vehicle to the one or more pedestrians proximate the autonomous vehicle, wherein the rendered proximate object display information comprises one or more pedestrian figures representing the one or more pedestrians proximate the autonomous vehicle; and
rendering instructions on the visual display system of the autonomous vehicle, the instructions instructing the one or more pedestrians proximate the autonomous vehicle to move in a particular direction, wherein the particular direction is indicated by an arrow.

22. The computing system of claim 21 wherein identifying the one or more humanoid shapes within the perception information includes:
comparing one or more defined humanoid shapes to one or more unidentified objects within the perception information to identify the one or more humanoid shapes within the perception information.

23. The computing system of claim 21 wherein the proximate object display information includes dynamic proximate object display information that changes as the location of the one or more detected humanoid shapes changes with respect to the autonomous vehicle.

24. The computing system of claim 23 wherein rendering the proximate object display information on the visual display system includes:
rendering the dynamic proximate object display information on the visual display system, thus dynamically confirming the perception of the one or more pedestrians by the autonomous vehicle.

25. The computing system of claim 21 wherein the one of more machine vision sensors includes a LIDAR system.

26. The computing system of claim 21 wherein the visual display system is configured to be mounted on a roof of the autonomous vehicle.

27. The computing system of claim 21 wherein the visual display system is a cylindrical visual display system.

28. The computing system of claim 27 wherein the cylindrical visual display system includes:
an illuminated portion; and
a non-illuminated portion positioned between the illuminated portion and a roof of the autonomous vehicle.

29. The computing system of claim 21 wherein the visual display system is a 360 degree visual display system.

30. The computing system of claim 21 wherein the visual display system is integrated into the autonomous vehicle.

* * * * *